United States Patent

[11] 3,550,970

| [72] | Inventor | Vilhelm Einar Stellan Hjerten |
| | | Uppsala, Sweden |
| [21] | Appl. No. | 721,348 |
| [22] | Filed | Apr. 15, 1968 |
| [45] | Patented | Dec. 29, 1970 |
| [73] | Assignee | IRD Incentive Research & Development AB |
| | | Bromma, Sweden |
| [32] | Priority | Apr. 20, 1967 |
| [33] | | Sweden |
| [31] | | No. 5528/67 |

[54] LEAKAGE-FREE SEALING
3 Claims, 2 Drawing Figs.

[52] U.S. Cl. .................................................. 308/36.1, 277/59
[51] Int. Cl. .................................................. F16d 33/72; F16j 15/00
[50] Field of Search .................................... 308/36.1, 36.3; 277/59, 70, 71; 204/(Inquired)

[56] References Cited
UNITED STATES PATENTS

| 1,258,218 | 5/1918 | Hicks | 308/36.3 |
| 2,488,200 | 11/1949 | Juhlin | 277/59 |
| 3,081,095 | 3/1963 | Hamrick | 277/59X |
| 3,100,105 | 8/1963 | Randall | 277/59X |
| 3,129,011 | 4/1964 | Campbell | 277/59 |
| 3,261,611 | 7/1966 | Maidment | 277/59X |
| 3,319,647 | 5/1967 | Morain | 277/59X |
| 2,449,138 | 9/1948 | Phillips | 308/36.1 |
| 2,859,261 | 11/1958 | Arbeit | 308/M |
| 3,089,423 | 5/1963 | Raube | 277/59X |
| 3,273,944 | 9/1966 | Hammon | 308/241X |

FOREIGN PATENTS

| 835,097 | 3/1952 | Germany | 277/59 |
| 858,483 | 12/1952 | Germany | 277/59 |
| 465,048 | 8/1951 | Italy | 277/59 |
| 400,438 | 4/1966 | Switzerland | 277/59 |

*Primary Examiner* — Wesley S. Ratliff, Jr.
*Attorney* — Fred C. Philpitt

ABSTRACT: A leakage free sealing for providing insulation between liquids which are in contact with the outer wall of a rotating tube of, e.g. glass or quartz, comprising a wall surrounding the rotating tube and two sealing rings mounted in said surrounding wall and spaced apart from each other. The sealing rings have a close running fit with the rotating tube and form together with the surrounding wall a chamber surrounding the rotating tube. The chamber is provided with inlet and outlet ducts for providing air circulation through said chamber in order to absorb moisture leaking into said chamber.

PATENTED DEC29 1970 3,550,970

LEAKAGE-FREE SEALING

DESCRIPTION OF THE INVENTION

The present invention relates to a leakage-free sealing and more particularly to a leakage-free sealing for providing electrical insulation between two liquids which are both in contact with the outer wall of a rotating tube. This type of insulation is necessary e.g. in an electrophoresis apparatus of the type described in my copending Patent application No. 601,963 filed Dec. 15, 1966, now U.S. Pat. No. 3,505,524.

An electrophoresis apparatus is used to separate and analyze substances, e.g. proteins. In the technique called free zone electrophoresis the separation chamber comprises a transparent electrophoresis tube containing the electrophoresis liquid or buffer in which the sample substance is introduced. The tube is mounted horizontally and rotated about its longitudinal axis to eliminate convection in the sample. The buffer is at the ends of the electrophoresis tube connected to electrode vessels also containing buffer. The design of the connection is such that the buffer is in contact with the outer wall of the tube at the end sections of the tube. The electrophoresis tube must be immersed in a liquid bath in order to control the temperature. As measuring and controlling the current through the electrophoresis tube is important for the electrophoresis process, it is necessary to avoid leakage current from the electrophoresis fluid to the cooling liquid. This is very difficult because the electrophoresis tube is rotating during the process.

Accordingly, the object of the invention is to provide a leakage-free sealing which in an effective way can insulate two liquids from each other when both liquids are in contact with the outer wall of a rotating tube.

The invention will appear more clearly from the following detailed description when taken in connection with the accompanying drawings, showing by way of example a preferred embodiment of the inventive idea.

Figure 1:
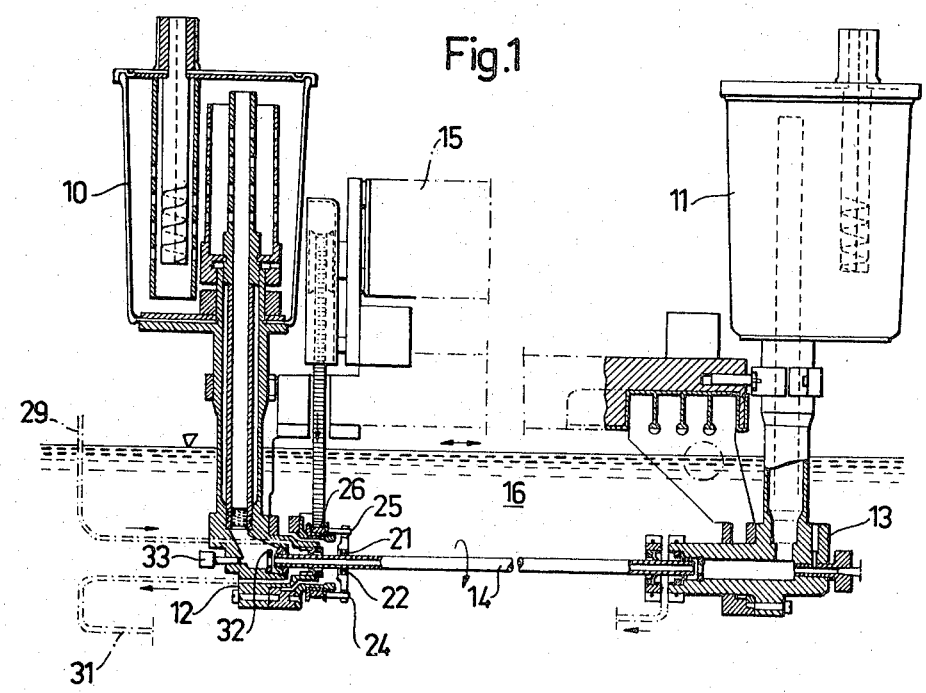
FIG. 1 shows a general view, partly in section, of the used electrophoresis apparatus.

Referring now to FIG. 1, the electrophoresis apparatus comprises two electrode vessels 10 and 11 with connecting arms 12 and 13 to the ends of a rotating transparent electrophoresis tube 14 of glass or quartz. The arms are provided with bearings and seals for the ends of the electrophoresis tube as shown more in detail in FIG. 2. A motor 15 is geared to rotate the electrophoresis tube 14 at about 40 rev./min. The electrophoresis tube 14, the arms 12 and 13 and the vessels 10 and 11 contain the buffer liquid. The electrophoresis tube and parts of the connecting arms are immersed in a water bath 16 to achieve efficient dissipation of the joule heat. As the buffer at the ends of the electrophoresis tube is in contact with the outer wall of the tube and the cooling liquid in the water bath also is in contact with said outer wall of the tube it is necessary to provide a seal between these two liquids to avoid leakage currents between the electrophoresis liquid and the cooling liquid. During the analyzing process on the sample substance in the electrophoresis tube the current through the tube is measured, e.g. by means of an ammeter connected in series with the electrode vessels outside the apparatus. This current must be controlled carefully and therefore leakage current from the electrophoresis liquid to the cooling liquid will be detrimental to the result of the analysis.

Figure 2:
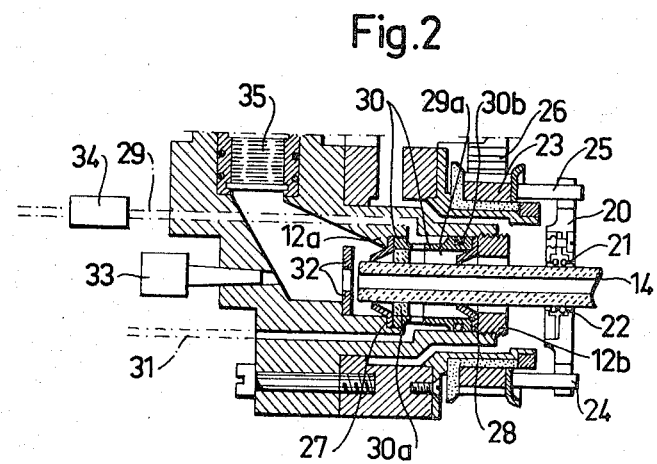
FIG. 2 is a sectional view of the end bearing of the tube showing the sealing arrangement.

The bearing and the leakage-free sealing are shown in detail in FIG. 2. Only the arrangement in arm 12 is shown in detail but it is understood that the arrangement in arm 13 is identical. The end of the electrophoresis tube 14 is connected to an aluminum disc 20, which is friction-coupled to the tube by two O-rings 21 and 22. The aluminum disc 20 is connected to a toothed wheel 23 by means of drive pins 24 and 25. The toothed wheel 23 is in driving connection with a cogged belt 26 which in turn is driven by the motor 15. The sealing arrangement comprises two spaced sealing rings 27, 28 of an elastic material which are mounted in the inner wall of the arm 12. The inner rims of the two rings are in close contact with the electrophoresis tube. Through an inlet duct 29, debouching between the two rings 27 and 28, dry air is supplied to the space 29a between the two rings. The two rings are spaced apart by means of a spacer tube 30, provided with a bearing 30a for the tube and a tightening O-ring 30b in contact with the arm wall. The two sealing rings 27, 28 and the spacer tube 30 are fixed in their positions by means of a shoulder 12 on the inner wall of arm 12 and a nut 12b pressing the sealing arrangement towards the shoulder. The space between the two rings is also provided with an air outlet duct 31. The disc 32 at the left hand side of the electrophoresis tube and its partner at the other end of the tube prevent the tube from moving longitudinally. A plug 33 is provided for draining of the electrophoresis liquid. The air in the inlet duct passes through a drying device 34, for instance comprising silica gel. A gel plug 35 is provided in arm 12 to prevent hydrodynamic streaming of buffer through the electrophoresis tube.

During an analyzing procedure the electrophoresis tube is rotated by means of the motor 15. During the rotation of the tube liquid is creeping under the sealing rings 27, 28 to the space 29a between the two sealing rings. This creeping liquid stream would after a while give rise to leakage current. However, due to the dry air supplied to the space between the two rings, the leaking liquid is absorbed by the air stream and transported out of the space between the two rings. Due to this dry air stream the amount of liquid or the humidity in the space between the two sealing rings will never rise to a level where leakage currents can arise. Thus, a complete leakage-free sealing is provided between the electrophoresis liquid and the cooling liquid.

I claim:

1. Leakage free sealing for insulation between two liquids surrounding a tube of electrically insulating material rotating about its longitudinal axis, comprising an outer wall at least partly surrounding the rotating tube, a shoulder on the inner surface of this wall, a first sealing ring abutting said shoulder and having a close running fit with the rotating tube, a spacer tube inserted in the outer wall and having an inner diameter greater than the outer diameter of the rotating tube, a bearing for the rotating tube mounted in said spacer tube, a second sealing ring spaced apart from the first sealing ring by said spacer tube and having a close running fit with the rotating tube, said first sealing ring, the spacer tube and the second sealing ring forming a chamber surrounding the rotating tube, means for pressing the first sealing ring, the spacer tube and the second sealing ring against the shoulder, an inlet duct debouching in said chamber, an outlet duct extending from said chamber, and means connected to said ducts to provide dry gas circulation through said chamber.

2. Leakage free sealing according to claim 1, using air as dry gas, comprising an air-drying device through which the inlet duct passes, said drying device comprising a moisture absorbing substance.

3. An electrically insulating seal for electrophoresis comprising:
   a. a seal housing;
   b. a rotating tube of insulating material mounted within said housing and extending outwardly into a first liquid body;
   c. said housing having means to supply a second liquid to the interior of said rotating tube;
   d. a first insulating sealing ring mounted within said housing and having a close running fit with said rotating tube to provide a seal for said first liquid body;
   e. a second insulating sealing ring mounted within said housing and having a close running fit with said rotating tube to provide a seal for said second liquid;
   f. said second sealing ring being spaced from said first sealing ring to define a chamber between the two rings, said rotating tube;
   g. said housing defines at shoulder on its inner wall defining an inlet duct communicating to, and an outlet duct communicating from said chamber, and means for providing a dry gas stream through said chamber;

h. wherein said housing defines a shoulder on its inner wall, said second insulating sealing ring abutting said shoulder, a spacer tube mounted within said housing and surrounding said rotating tube to define said chamber between the first and second insulating seals, said spacer tube defining dry gas stream inlet and outlet openings, and means for urging said second insulating seal, said spacer, and said first insulating seal against said shoulder defined by said housing; and i. wherein the support bearing for said rotating tube is mounted within said spacer tube between said first and second insulating seals, whereby any liquid or excess humidity that would effect the electrical impedance between said first and second liquids is removed from said chamber by said dry gas stream through said outlet duct.